Nov. 22, 1955     A. G. M. MICHELL ET AL     2,724,622
FILM-LUBRICATED BEARINGS
Original Filed Aug. 23, 1944     2 Sheets-Sheet 1
FIG.1.
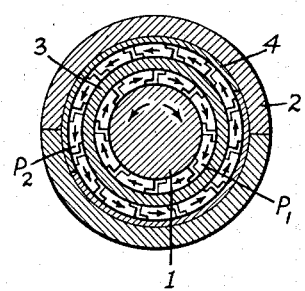
FIG.2.
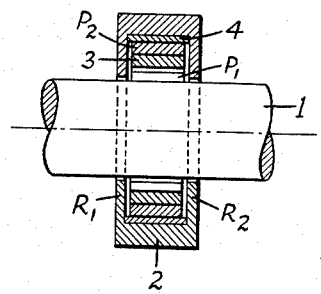
FIG.3.
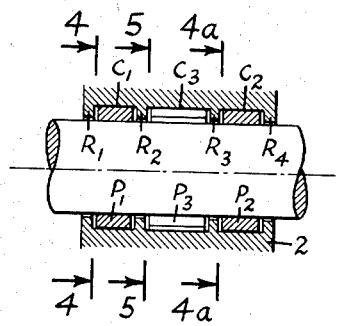
FIG.4.
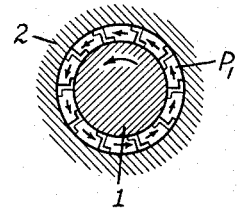
FIG.5.
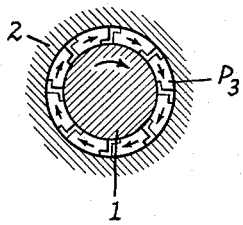
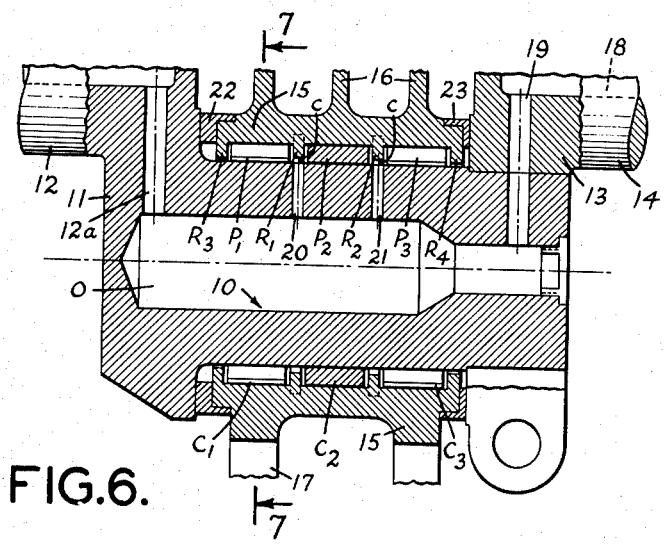
FIG.6.
INVENTORS.
ANTHONY GEORGE MALDON MICHELL
AUGUST JOHN SEGGEL
BY *E. W. Marshall*
ATTORNEY.

Nov. 22, 1955  A. G. M. MICHELL ET AL.  2,724,622
FILM-LUBRICATED BEARINGS
Original Filed Aug. 23, 1944  2 Sheets-Sheet 2

INVENTORS.
ANTHONY GEORGE MALDON MICHELL
AUGUST JOHN SEGGEL
BY
E. W. Marshall
ATTORNEY.

United States Patent Office 2,724,622
Patented Nov. 22, 1955

2,724,622

FILM-LUBRICATED BEARINGS

Anthony George Maldon Michell, Camberwell, Victoria, and August John Seggel, Upper Hawthorn, Victoria, Australia Original application August 23, 1944, Serial No. 550,786, now Patent No. 2,534,788, dated December 19, 1950. Divided and this application October 23, 1950, Serial No. 191,532

2 Claims. (Cl. 308—73)

This invention relates to film-lubricated bearings of the type known as floating-pad bearings wherein pad-elements are located in annular series between inner and outer load-carrying members and are free to rotate with respect to the said members with films of lubricant interposed between the faces of said pads and the opposed faces of the said load-carrying members. Bearings of this type are described in the specifications of the applicants' application filed Sept. 8, 1937, Ser. No. 162,834, Patent No. 2,250,546, issued July 29, 1941, and also of their application filed Aug. 23, 1944, Ser. No. 550,786, Patent No. 2,534,788, issued Dec. 19, 1950. The present application is a division of the latter case of which Figs. 1, 2, 5, 6, 7 and Figs. 13 to 15, and 17 to 20 relate especially to the present invention and are reproduced herein as Figs. 1–12.

The special features which constitute the present invention are the means disclosed for maintaining an annular series of floating pads in circumferential alignment and for supplying them with lubricant especially during the starting of the motion of the bearing, these means comprising essentially the provisions within the outer load-carrying member of one or more channels retaining lubricant in which portions of the annular series of pads are immersed when the bearing is stationary, and of annular spaces from which the lubricant is distributed to the working surfaces of the floating pads when they are in motion.

Referring to the drawings,

Fig. 1 is a transverse section of a film-lubricated bearing according to the invention, wherein two annular series of pads are spaced concentrically by an intermediate ring and wherein the pads comprising one series are oriented for rotation in one direction and the pads in the other series are oriented for rotation in the opposite direction.

Fig. 2 is an axial section of the bearing shown in Fig. 1.

Fig. 3 is an axial section of a bearing having groups of pads adapting the journal to rotation in both directions.

Figs. 4 and 5 are cross sections of the bearing shown in Fig. 3 on the lines 4—4, 4a—4a and 5—5 respectively.

Fig. 6 is an axial section of a bearing having three annular series of pads constructed in accordance with the invention and applied to a crank-shaft assembly of well-known construction.

Figure 7:
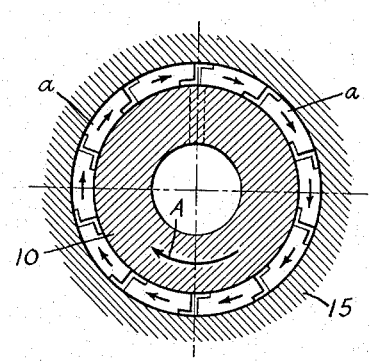

Fig. 7 is a partial cross section on the line 7—7 of Fig. 6.

Figure 8:
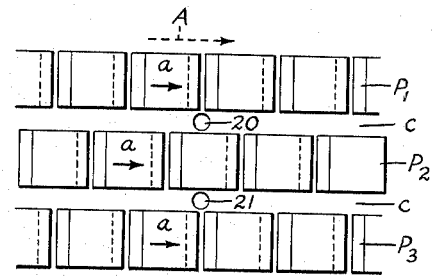

Fig. 8 is a developed view of the pads shown in Fig. 7.

Figure 9:
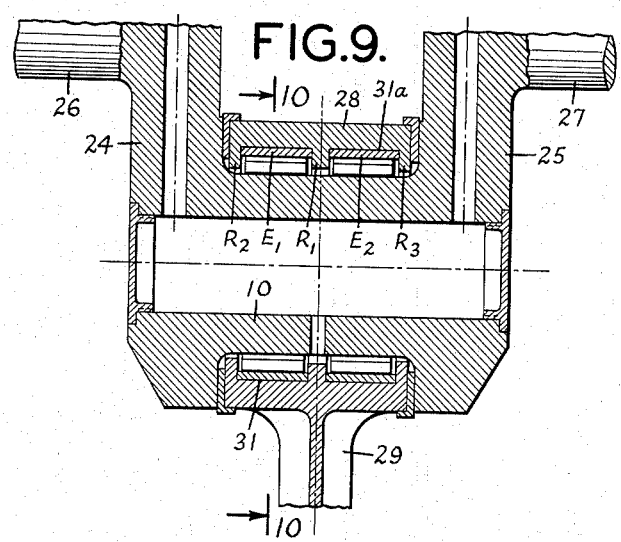

Fig. 9 is an axial section of a bearing having two annular series of pads, made in accordance with the invention and applied to a crank-pin journal formed integrally with opposed crank webs, the connecting rod big end in engagement with the journal being divided diametrically.

Figure 10:
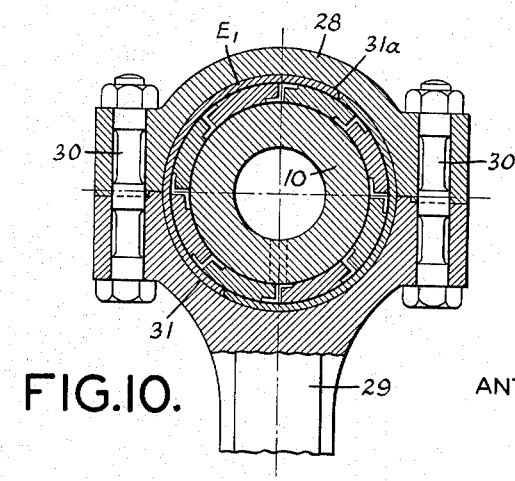

Fig. 10 is a cross section on the line 10—10 of Fig. 9.

Figure 11:
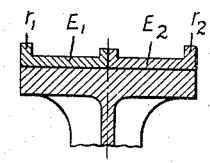
Figure 12:
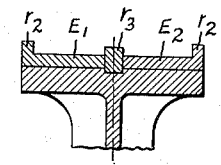

Figs. 11 and 12 are modified details of the bearing shown in Figs. 9 and 10.

Referring more particularly to Figs. 1 and 2, the numerals 1 and 2 designate respectively a journal and an outer bearing member concentric therewith, these being the load-carrying members of the bearing.

Located around the journal 1 is an annular series of floating pads $P_1$ which coact on their inner faces with the surface of the journal 1 and on their outer faces with the inner surface of a ring 3 disposed concentrically around the journal 1. Surrounding the ring 3 is another annular series of pads $P_2$, which coact on their inner faces with the ring 3 and on their outer faces with the inner peripheral surface of the outer bearing member 2, or, alternatively, as shown in Figs. 1 and 2, with a liner 4 fitted in said outer bearing member.

To maintain the pads $P_1$ and $P_2$ and the ring 3 in circumferential alignment, rims or flanges $R_1$ and $R_2$ are provided on the outer bearing member 2, thus forming a channel of somewhat greater width than the pads and ring, in which they may freely rotate and which may serve to retain lubricant in which portions of the annular series of pads $P_1$ and $P_2$ and the ring 3 are immersed when the bearing is stationary. The annular spaces between the pads and the flanges $R_1$ and $R_2$ serve to distribute the lubricant to the various pads when in motion.

In the arrangement shown in Figs. 3, 4 and 5, three series of floating pads are provided, the rings of pads $P_1$, $P_2$, $P_3$ being respectively housed in circumferential channels, $C_1$, $C_2$, $C_3$, which are formed around the interior of the bearing member 2, the pads of each series making working contact by their inner faces on the peripheral surface of the journal 1, and by their outer faces on the cylindrical surfaces which form the outer walls of the channels. The channels $C_1$, $C_2$ and $C_3$ are made somewhat wider than the axial widths of the respective pads $P_1$, $P_2$, and $P_3$, in order that the same may rotate with requisite freedom in the channels.

The sides of the channels $C_1$, $C_2$ and $C_3$ form rims or flanges $R_1$, $R_2$, $R_3$ and $R_4$, the rims $R_2$ and $R_3$ being located on opposite sides of the central channel $C_3$ and separating the same from the lateral channels $C_1$ and $C_2$. The rims $R_1$, $R_2$, $R_3$ and $R_4$ maintain the pads in circumferential alignment and prevent contact of adjacent series of pads as well as locating the same axially with respect to the journal 1.

It will be seen that if lubricant is supplied to the channels $C_1$, $C_2$ and $C_3$, a quantity of this lubricant will be retained in the lower segments of these channels when the bearing is stationary, portions of the annular series of pads $P_1$, $P_2$ and $P_3$, being then immersed, and that when motion commences this lubricant will be distributed circumferentially and will enter the spaces between the individual pads of each series so as to be available to lubricate both the working faces of each pad.

Referring now to Figs. 6, 7 and 8, the crank-pin 10 is formed integrally at one end with a crank web 11 and crankshaft journal 12, while at the other end it is detachably mounted in a separate crank web 13 formed integrally with a journal 14 located in coaxial alignment with the journal 12. The connecting-rod big end 15 is formed integrally with the master-rod 16, and with lugs, as 17, to which the secondary connecting rods are articulated.

The floating bearing pads are arranged in three annular series or rings $P_1$, $P_2$, $P_3$, the middle plane of the middle ring $P_2$ preferably coinciding with the middle plane of the master connecting rod, with the annuli $P_1$ and $P_3$ symmetrically arranged on each side of it.

The annular series of pads $P_1$, $P_2$ and $P_3$ are accommodated in circumferential channels $C_1$, $C_2$ and $C_3$ formed in the inner periphery of the big end 15.

In machining the channels $C_1$, $C_2$, $C_3$ two annular rims $R_1$, $R_2$ are formed between them, and two similar rims $R_3$, $R_4$ between the channels $C_1$ and $C_3$ respectively and the outer faces of the big end 15. The faces of these rims are smoothly finished, and the width of each channel in the axial direction is made greater than the width of the pads housed therein by a working clearance, so that the pads are free to revolve in the channels but are prevented from changing their alignment therein to an extent sufficient to impair the relations of their working surfaces to the surfaces of the crank-pin and channel. Alternatively, as indicated by dotted lines in Fig. 6, the annular rims $R_1$, $R_2$, $R_3$, $R_4$ may be in the form of separate rings fitted into grooves formed in the big end.

The inner radius of each of the rims $R_1$, $R_2$ is made greater than the inner radius of the pads, so as to form two annular spaces $c\ c$ around the crank-pin 10 between the series of pads $P_1$, $P_2$ and $P_3$, respectively. The inner radii of the rims $R_3$, $R_4$ is also greater than the inner radius of the pads, but preferably less than that of the rims $R_1$ and $R_2$.

According to a common practice, the lubricant for the bearing is introduced under pressure through holes, 18, 19 drilled respectively in the crank journal 14 and web 13, into the chamber 0 bored axially in the crank-pin 10. From the chamber 0 it is delivered by holes 20, 21, drilled radially in the crank-pin to the annular spaces $c\ c$ from which it flows over the working surfaces of the pads, and through the circumferential spaces between them to the ends of the crank-pin 10, where it may be allowed to escape between the crank webs 11 and 13 and the end surfaces of the big end 15 into the crankcase of the engine, lubricant being also passed on through hole 12$a$ to other lubrication points. Rings 22, 23, fitted between the end surfaces of the big end 15 and the corresponding surfaces of the crank webs 11, 13, may serve both to limit the quantity of lubricant which is allowed thus to escape to the crank-case and to serve as thrust rings, resisting forces acting in an axial direction between the big end and the crank webs. When the machine is stationary the lower portions of the channels $C_1$, $C_2$, $C_3$ act as small reservoirs of oil, in which portions of two or more pads of each annular series rest. This oil is available for lubricating the pads at starting.

In Fig. 8, which shows portions of all three annular series of pads $P_1$, $P_2$, $P_3$ developed into the plane of the drawing and seen from the exterior, the positions of the lubricating spaces $c\ c$ relatively to the holes 20, 21, in the crank-pin, and to the pads are clearly shown. The motion of the pads in their rotation around the crank-pin is indicated by the short arrows $a, a, a$, and the more rapid rotation of the big end (unseen in this view) by the longer dotted arrow A.

With special reference to Fig. 8, it will be apparent that when lubricant is supplied, as by the holes 20, 21, it is free to enter the annular spaces $c, c$ without any interference by the floating-pads, and to flow circumferentially around the said spaces, and thence in axial direction through the spaces between the individual pads of each series. The lubricant is thus made available for the lubrication of both the working faces of each pad without any perforation, or other interruption to the continuity, or reduction of effective area of such working faces.

According to the construction shown in Figs. 9 and 10, the crank-pin 10 is formed integrally with the crank webs 24 and 25, which may also be integral with the crank-shaft journals 26 and 27. The connecting-rod big end is divided on a plane through the axis of the crank-pin, the cap 28 being attached to the connecting-rod 29 by bolts 30 according to a usual practice. After assembly these two parts are accurately bored to the cylindrical surfaces 31, 31$a$ of equal diameter. Between, and on each outer side of these surfaces, rims $R_1$, $R_2$, $R_3$ are formed as already described in connection with Fig. 6, but in the present instance, by way of example, only three rims are shown instead of four as in that figure. Alternatively, the rims may be separate rings formed in halves and fitted into peripheral grooves in the big end, as is indicated by the central rim $r_3$ shown in Fig. 12. Between the rims $R_1$, $R_2$ and $R_1$, $R_3$ respectively are fitted two rings $E_1$ and $E_2$, which form the bearing surfaces for the outer faces of the pads of the bearing. Each of these rings consists of two parts meeting on an axial plane which is preferably at an angle to the plane of division of the big end, see Fig. 10.

As shown in Fig. 11, the rings $E_1$, $E_2$, instead of having plain cylindrical internal surfaces, may be formed with inwardly projecting rims $r_1$, $r_2$ on each of their sides, these rims taking the place of, and serving the same purposes, as the rims $R_1$, $R_2$, $R_3$ formed in the big end according to Fig. 9. Furthermore, the rings $E_1$, $E_2$ may be formed with rims $r_2$ at their outer sides, while a separate rim $r_3$ made in halves and fitting a groove in the inner periphery of the big end, may be interposed between the inner sides of the rings, see Fig. 12.

In all cases, when the crank-pin is formed integrally with the crank webs, the rings are divided diametrically to enable them to be placed in position.

We claim:

1. In a film-lubricated bearing comprising inner and outer relatively rotatable load carrying members and floating pad elements having substantial width and thickness arranged in a plurality of annular series between the inner and outer load carrying members with the pads of at least one of said series faced oppositely to those of another series and adapted to rotate with respect to said members, rims arranged between said annular series around the inner circumference of the outer of the load carrying members and separated from the inner of said members so as to form annular spaces for lubricant, wider in an axial direction than the pad elements, and conduits for said lubricant in the inner of said members for conveying said lubricant to said annular spaces.

2. In a film-lubricated bearing comprising inner and outer relatively rotatable circumferentially spaced load carrying members and floating pad elements having substantial width and thickness arranged in a plurality of annular series between the inner and outer load carrying members with the pads of at least one of said series faced oppositely to those of another series and adapted to rotate with respect to said members in annular channels wider in an axial direction than the pads, rims arranged between said annular series around the inner circumference of the outer of said load carrying members and separated from the inner of said members so as to form said annular channels, and means for leading lubricant directly into said channels and into the spaces between the individual pads of each series and between said series of pads and the rims.

References Cited in the file of this patent

UNITED STATES PATENTS

| | | |
|---|---|---|
| Re. 18,080 | Gotz | May 26, 1931 |
| 2,268,770 | Orshansky | Jan. 6, 1942 |
| 2,534,788 | Michell | Dec. 19, 1950 |

FOREIGN PATENTS

| | | |
|---|---|---|
| 549,301 | Germany | Apr. 25, 1932 |